US008653417B2

(12) United States Patent  
Peters

(10) Patent No.: US 8,653,417 B2
(45) Date of Patent: Feb. 18, 2014

(54) METHOD AND SYSTEM TO START AND USE A COMBINATION FILLER WIRE FEED AND HIGH INTENSITY ENERGY SOURCE

(75) Inventor: Steven R. Peters, Huntsburg, OH (US)

(73) Assignee: Lincoln Global, Inc., City of Industry, CA (US)

( * ) Notice: Subject to any disclaimer, the term of this patent is extended or adjusted under 35 U.S.C. 154(b) by 309 days.

(21) Appl. No.: 12/352,667

(22) Filed: Jan. 13, 2009

(65) Prior Publication Data

US 2010/0176109 A1 Jul. 15, 2010

(51) Int. Cl.
- B23K 9/28 (2006.01)
- B23K 9/10 (2006.01)
- B23K 9/12 (2006.01)
- B23K 9/06 (2006.01)
- B23H 1/04 (2006.01)

(52) U.S. Cl.
USPC .............. 219/137.61; 219/130.01; 219/130.1; 219/130.21; 219/130.31; 219/130.32; 219/130.33; 219/130.4; 219/130.5

(58) Field of Classification Search
USPC ................ 219/137.61, 130.51, 130.21; 445/5
See application file for complete search history.

(56) References Cited

U.S. PATENT DOCUMENTS

| | | | |
|---|---|---|---|
| 4,467,176 A | | 8/1984 | Mizuno et al. |
| 4,614,856 A | * | 9/1986 | Hori et al. ................. 219/130.21 |
| 4,737,612 A | | 4/1988 | Bruck et al. |
| 4,788,412 A | * | 11/1988 | Hori et al. ................ 219/137 PS |
| 4,803,334 A | | 2/1989 | Burke et al. |
| 4,866,247 A | | 9/1989 | Parks et al. |
| 4,972,064 A | | 11/1990 | Stava |
| 5,148,001 A | | 9/1992 | Stava |
| 5,278,390 A | | 1/1994 | Blankenship |
| 5,343,016 A | * | 8/1994 | Davis et al. ................. 219/130.4 |
| 5,714,735 A | | 2/1998 | Offer |

(Continued)

FOREIGN PATENT DOCUMENTS

| | | |
|---|---|---|
| DE | 2545075 | 10/1975 |
| DE | 2501928 | 1/1978 |

(Continued)

OTHER PUBLICATIONS

Digital Communications Improves Productivity, Quality and Safety, NX-1.20, Mar. 2006, www.lincolnelectric.com, pp. 1-12.

(Continued)

Primary Examiner — Henry Yuen
Assistant Examiner — Diallo I Duniver
(74) Attorney, Agent, or Firm — Perkins Coie LLP

(57) ABSTRACT

A method and system to start and use a combination wire feed and energy source system for any of brazing, cladding, building up, filling, and hard-facing overlaying applications. High intensity energy is applied onto a workpiece to heat the workpiece. One or more resistive filler wires are fed toward the workpiece at or just in front of the applied high intensity energy. Sensing of when a distal end of the one or more resistive filler wires makes contact with the workpiece at or near the applied high intensity energy is accomplished. Electric heating current to the one or more resistive filler wires is controlled based on whether or not the distal end of the one or more resistive filler wires is in contact with the workpiece. The applied high intensity energy and the one or more resistive filler wires are moved in a same direction along the workpiece in a fixed relation to each other.

23 Claims, 5 Drawing Sheets

(56) References Cited

U.S. PATENT DOCUMENTS

| | | |
|---|---|---|
| 5,793,009 A | 8/1998 | Offer |
| 5,958,261 A | 9/1999 | Offer et al. |
| 5,994,659 A | 11/1999 | Offer |
| 6,023,043 A | 2/2000 | Manabe et al. |
| 6,034,343 A | 3/2000 | Hashimoto et al. |
| 6,051,810 A | 4/2000 | Stava |
| 6,191,379 B1 | 2/2001 | Offer et al. |
| 6,498,321 B1 | 12/2002 | Fulmer et al. |
| 6,521,861 B2 | 2/2003 | Jones et al. |
| 6,989,507 B2 | 1/2006 | Clark |
| 7,109,439 B2 | 9/2006 | Stava |
| 7,408,130 B2 | 8/2008 | Sonoda et al. |
| 7,842,900 B2 | 11/2010 | Longfield et al. |
| 2004/0074884 A1* | 4/2004 | Butler et al. ............... 219/130.4 |
| 2007/0056942 A1 | 3/2007 | Daniel et al. |
| 2007/0119829 A1 | 5/2007 | Vietz et al. |
| 2007/0164007 A1 | 7/2007 | Peters et al. |
| 2007/0235429 A1 | 10/2007 | Revel et al. |
| 2008/0006612 A1 | 1/2008 | Peters et al. |
| 2008/0128395 A1 | 6/2008 | Aigner et al. |
| 2009/0230099 A1 | 9/2009 | Aalto et al. |
| 2010/0206856 A1 | 8/2010 | Tanaka et al. |
| 2010/0326969 A1 | 12/2010 | Tsukamoto et al. |
| 2011/0000890 A1 | 1/2011 | Arjakine et al. |
| 2011/0042361 A1 | 2/2011 | Nowak et al. |

FOREIGN PATENT DOCUMENTS

| | | |
|---|---|---|
| DE | 4412093 A1 | 10/1995 |
| EP | 0304855 | 8/1988 |
| EP | 1454703 | 9/2006 |
| EP | 1920864 | 5/2008 |
| JP | 09-201687 | 8/1997 |
| JP | 2002239731 | 8/2002 |
| KR | 20040034774 | 4/2004 |

OTHER PUBLICATIONS

Power Wave 445M Robotic & Power Wave 445M/STT Robotic, Publication E10.90 Apr. 2003, www.lincolnelectric.com, pp. 1-8.

PCT/IB2009/007882 International Search Report and Written Opinion.

\* cited by examiner

METHOD AND SYSTEM TO START AND USE A COMBINATION FILLER WIRE FEED AND HIGH INTENSITY ENERGY SOURCE

TECHNICAL FIELD

Certain embodiments relate to filler wire overlaying applications. More particularly, certain embodiments relate to a system and method to start and use a combination filler wire feed and energy source system for any of brazing, cladding, building up, filling, and hard-facing overlaying applications.

BACKGROUND

The traditional filler wire method of welding (e.g., a gas-tungsten arc welding (GTAW) filler wire method) provides increased deposition rates and welding speeds over that of traditional arc welding alone. The filler wire, which leads a torch, is resistance-heated by a separate power supply. The wire is fed through a contact tube toward a workpiece and extends beyond the tube. The extension is resistance-heated such that the extension approaches or reaches the melting point and contacts the weld puddle. A tungsten electrode may be used to heat and melt the workpiece to form the weld puddle. The power supply provides a large portion of the energy needed to resistance-melt the filler wire. In some cases, the wire feed may slip or faulter and the current in the wire may cause an arc to occur between the tip of the wire and the workpiece. The extra heat of such an arc may cause burnthrough and spatter. The risk of such an arc occurring is greater at the start of the process where the wire initially comes in contact with the workpiece at a small point. If the initial current in the wire is too high, the point may burn away, causing an arc to occur.

Further limitations and disadvantages of conventional, traditional, and proposed approaches will become apparent to one of skill in the art, through comparison of such approaches with embodiments of the present invention as set forth in the remainder of the present application with reference to the drawings.

SUMMARY

Embodiments of the present invention comprise a system and method to start and use a combination filler wire feeder and energy source system. A first embodiment of the present invention comprises a method to start and use a combination wire feed and energy source system for any of brazing, cladding, building up, filling, and hard-facing overlaying applications. The method includes applying a sensing voltage between at least one resistive filler wire and a workpiece via a power source and advancing a distal end of the at least one resistive filler wire toward the workpiece. The method further includes sensing when the distal end of the at least one resistive filler wire first makes contact with the workpiece. The method also includes turning off the power source to the at least one resistive filler wire over a defined time interval in response to the sensing. The method further includes turning on the power source at an end of the defined time interval to apply a flow of heating current through the at least one resistive filler wire. The method also includes applying energy from a high intensity energy source to the workpiece to heat the workpiece at least while applying the flow of heating current. The high intensity energy source may include at least one of a laser device, a plasma arc welding (PAW) device, a gas tungsten arc welding (GTAW) device, a gas metal arc welding (GMAW) device, a flux cored arc welding (FCAW) device, and a submerged arc welding (SAW) device.

These and other features of the claimed invention, as well as details of illustrated embodiments thereof, will be more fully understood from the following description and drawings.

DETAILED DESCRIPTION

The term "overlaying" is used herein in a broad manner and may refer to any applications including brazing, cladding, building up, filling, and hard-facing. For example, in a "brazing" application, a filler metal is distributed between closely fitting surfaces of a joint via capillary action. Whereas, in a "braze welding" application the filler metal is made to flow into a gap. As used herein, however, both techniques are broadly referred to as overlaying applications.

Figure 1:
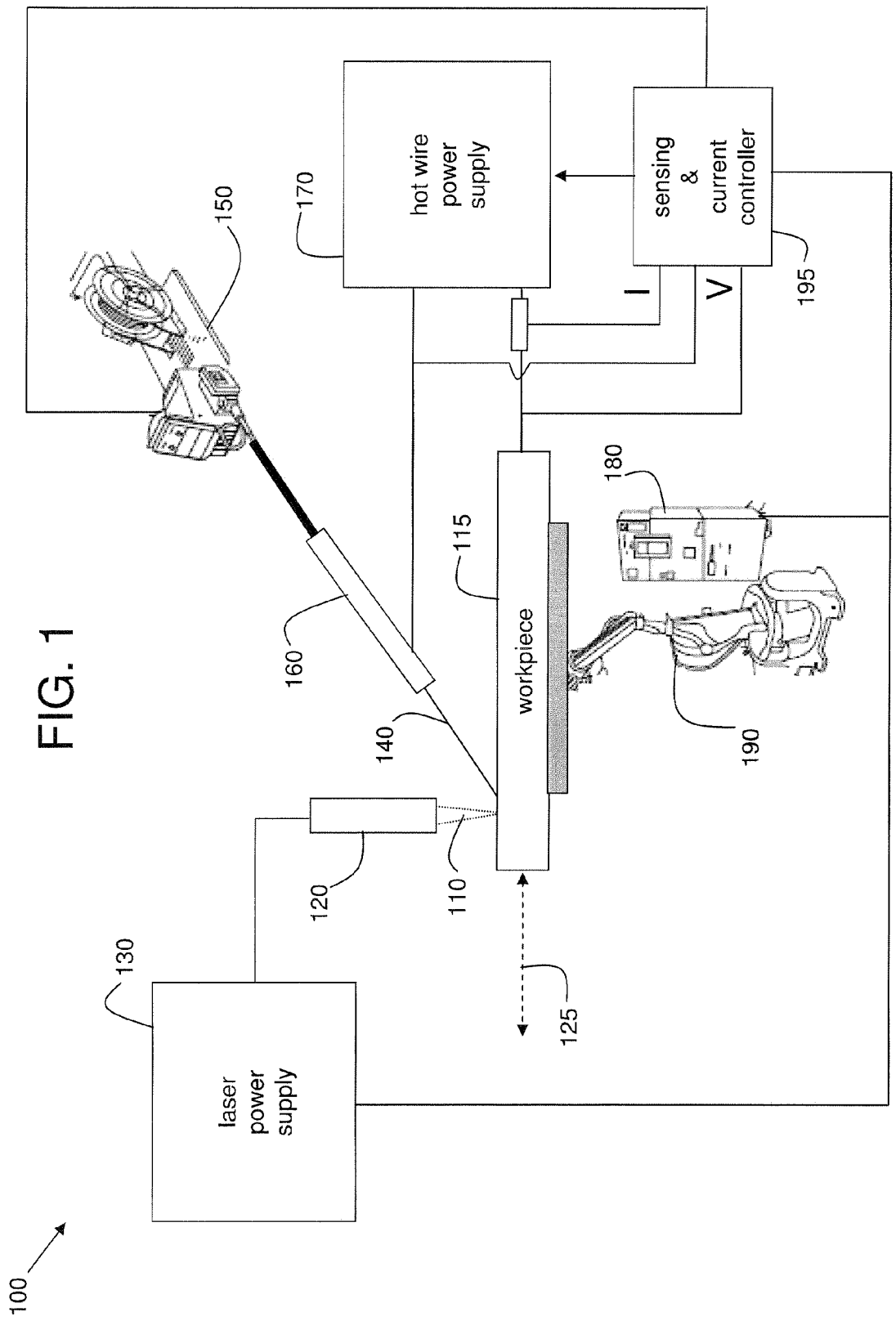
FIG. 1 illustrates a functional schematic block diagram of an exemplary embodiment of a combination filler wire feeder and energy source system for any of brazing, cladding, building up, filling, and hard-facing overlaying applications.

FIG. 1 illustrates a functional schematic block diagram of an exemplary embodiment of a combination filler wire feeder and energy source system 100 for performing any of brazing, cladding, building up, filling, and hard-facing overlaying applications. The system 100 includes a laser subsystem capable of focusing a laser beam 110 onto a workpiece 115 to heat the workpiece 115. The laser subsystem is a high intensity energy source. Other embodiments of the system may include at least one of a plasma arc welding subsystem, a gas tungsten arc welding subsystem, a gas metal arc welding subsystem, a flux cored arc welding subsystem, and a submerged arc welding subsystem serving as the high intensity energy source. The laser subsystem includes a laser device 120 and a laser power supply 130 operatively connected to each other. The laser power supply 130 provides power to operate the laser device 120.

The system 100 also includes a hot filler wire feeder subsystem capable of providing at least one resistive filler wire 140 to make contact with the workpiece 115 in the vicinity of the laser beam 110. The hot filler wire feeder subsystem includes a filler wire feeder 150, a contact tube 160, and a hot wire power supply 170. During operation, the filler wire 140, which leads the laser beam 110, is resistance-heated by electrical current from the hot wire welding power supply 170 which is operatively connected between the contact tube 160 and the workpiece 115. In accordance with an embodiment of the present invention, the hot wire welding power supply 170 is a pulsed direct current (DC) power supply, although alternating current (AC) or other types of power supplies are possible as well. The wire 140 is fed from the filler wire feeder 150 through the contact tube 160 toward the workpiece 115 and extends beyond the tube 160. The extension portion of the wire 140 is resistance-heated such that the extension portion approaches or reaches the melting point before contacting a weld puddle on the workpiece. The laser beam 110 serves to melt some of the base metal of the workpiece 115 to form a weld puddle and also to melt the wire 140 onto the workpiece 115. The power supply 170 provides a large portion of the energy needed to resistance-melt the filler wire 140. The feeder subsystem may be capable of simultaneously providing one or more wires, in accordance with certain other embodiments of the present invention. For example, a first wire may be used for hard-facing and/or providing corrosion resistance to the workpiece, and a second wire may be used to add structure to the workpiece.

The system 100 further includes a motion control subsystem capable of moving the laser beam 110 (energy source) and the resistive filler wire 140 in a same direction 125 along the workpiece 115 (at least in a relative sense) such that the laser beam 110 and the resistive filler wire 140 remain in a fixed relation to each other. According to various embodiments, the relative motion between the workpiece 115 and the laser/wire combination may be achieved by actually moving the workpiece 115 or by moving the laser device 120 and the hot wire feeder subsystem. In FIG. 1, the motion control subsystem includes a motion controller 180 operatively connected to a robot 190. The motion controller 180 controls the motion of the robot 190. The robot 190 is operatively connected (e.g., mechanically secured) to the workpiece 115 to move the workpiece 115 in the direction 125 such that the laser beam 110 and the wire 140 effectively travel along the workpiece 115. In accordance with an alternative embodiment of the present invention, the laser device 110 and the contact tube 160 may be integrated into a single head. The head may be moved along the workpiece 115 via a motion control subsystem operatively connected to the head.

In general, there are several methods that a high intensity energy source/hot wire may be moved relative to a workpiece. If the workpiece is round, for example, the high intensity energy source/hot wire may be stationary and the workpiece may be rotated under the high intensity energy source/hot wire. Alternatively, a robot arm or linear tractor may move parallel to the round workpiece and, as the workpiece is rotated, the high intensity energy source/hot wire may move continuously or index once per revolution to, for example, overlay the surface of the round workpiece. If the workpiece is flat or at least not round, the workpiece may be moved under the high intensity energy source/hot wire as shown if FIG. 1. However, a robot arm or linear tractor or even a beam-mounted carriage may be used to move a high intensity energy source/hot wire head relative to the workpiece.

The system 100 further includes a sensing and current control subsystem 195 which is operatively connected to the workpiece 115 and the contact tube 160 (i.e., effectively connected to the output of the hot wire power supply 170) and is capable of measuring a potential difference (i.e., a voltage V) between and a current (I) through the workpiece 115 and the hot wire 140. The sensing and current control subsystem 195 may further be capable of calculating a resistance value (R=V/I) and/or a power value (P=V*I) from the measured voltage and current. In general, when the hot wire 140 is in contact with the workpiece 115, the potential difference between the hot wire 140 and the workpiece 115 is zero volts or very nearly zero volts. As a result, the sensing and current control subsystem 195 is capable of sensing when the resistive filler wire 140 is in contact with the workpiece 115 and is operatively connected to the hot wire power supply 170 to be further capable of controlling the flow of current through the resistive filler wire 140 in response to the sensing, as is described in more detail later herein. In accordance with another embodiment of the present invention, the sensing and current controller 195 may be an integral part of the hot wire power supply 170.

In accordance with an embodiment of the present invention, the motion controller 180 may further be operatively connected to the laser power supply 130 and/or the sensing and current controller 195. In this manner, the motion controller 180 and the laser power supply 130 may communicate with each other such that the laser power supply 130 knows when the workpiece 115 is moving and such that the motion controller 180 knows if the laser device 120 is active. Similarly, in this manner, the motion controller 180 and the sensing and current controller 195 may communicate with each other such that the sensing and current controller 195 knows when the workpiece 115 is moving and such that the motion controller 180 knows if the hot filler wire feeder subsystem is active. Such communications may be used to coordinate activities between the various subsystems of the system 100.

Figure 2:
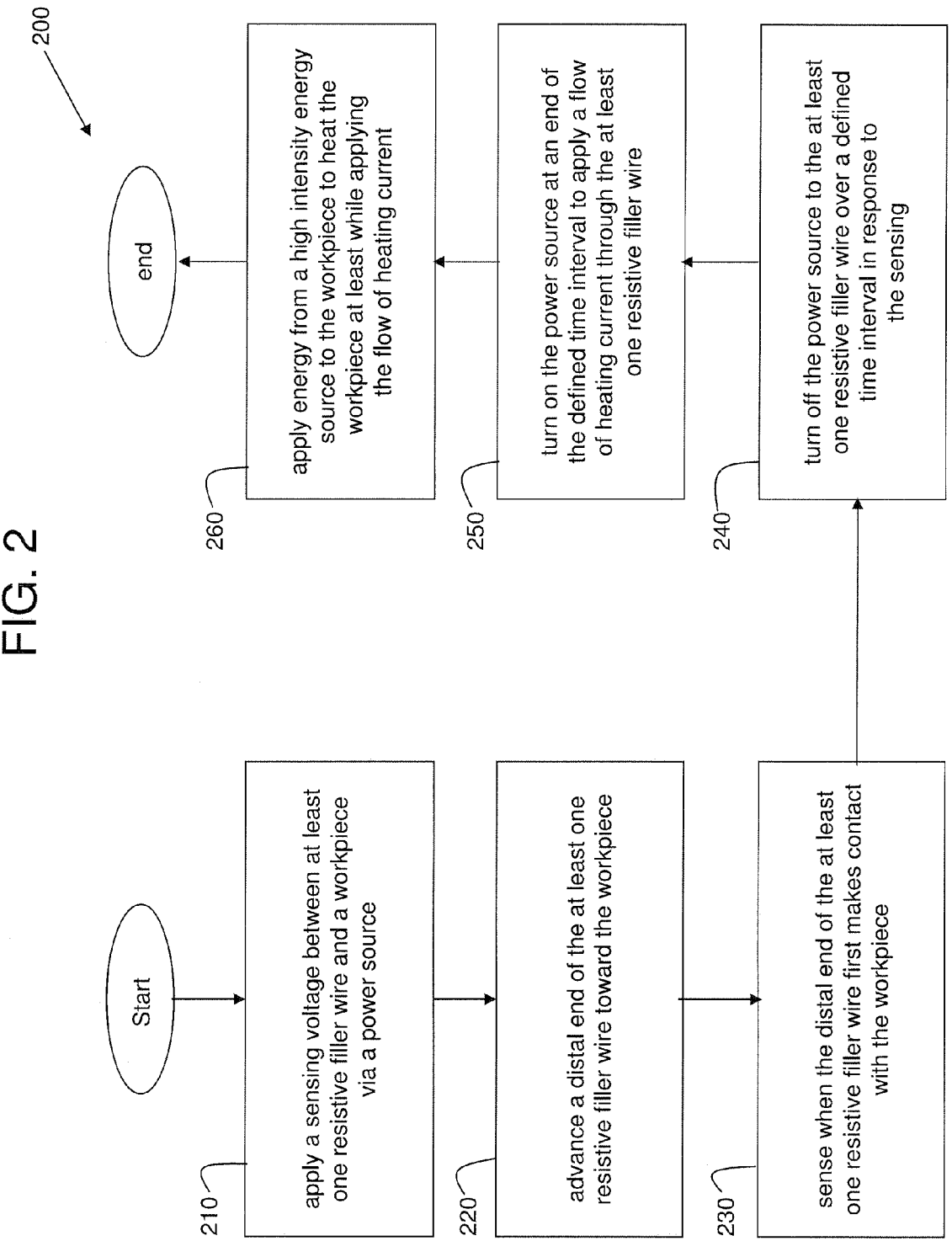
FIG. 2 illustrates a flow chart of an embodiment of a start-up method used by the system of FIG. 1.

FIG. 2 illustrates a flow chart of an embodiment of a start-up method 200 used by the system 100 of FIG. 1. In step 210, apply a sensing voltage between at least one resistive filler wire 140 and a workpiece 115 via a power source 170. The sensing voltage may be applied by the hot wire power supply 170 under the command of the sensing and current controller 195. Furthermore, the applied sensing voltage does not provide enough energy to significantly heat the wire 140, in accordance with an embodiment of the present invention. In step 220, advance a distal end of the at least one resistive filler wire 140 toward the workpiece 115. The advancing is performed by the wire feeder 150. In step 230, sense when the distal end of the at least one resistive filler wire 140 first makes contact with the workpiece 115. For example, the sensing and current controller 195 may command the hot wire power supply 170 to provide a very low level of current (e.g., 3 to 5 amps) through the hot wire 140. Such sensing may be accomplished by the sensing and current controller 195 measuring a potential difference of about zero volts (e.g., 0.4V) between the filler wire 140 (e.g., via the contact tube 160) and the workpiece 115. When the distal end of the filler wire 140 is shorted to the workpiece 115 (i.e., makes contact with the workpiece), a significant voltage level (above zero volts) may not exist between the filler wire 140 and the workpiece 115.

In step 240, turn off the power source 170 to the at least one resistive filler wire 140 over a defined time interval (e.g., several milliseconds) in response to the sensing. The sensing and current controller 195 may command the power source 170 to turn off. In step 250, turn on the power source 170 at an end of the defined time interval to apply a flow of heating current through the at least one resistive filler wire 140. The sensing and current controller 195 may command the power source 170 to turn on. In step 260, apply energy from a high intensity energy source 110 to the workpiece 115 to heat the workpiece 115 at least while applying the flow of heating current.

As an option, the method 200 may include stopping the advancing of the wire 140 in response to the sensing, restarting the advancing (i.e., re-advancing) of the wire 140 at the end of the defined time interval, and verifying that the distal end of the filler wire 140 is still in contact with the workpiece 115 before applying the flow of heating current. The sensing and current controller 195 may command the wire feeder 150 to stop feeding and command the system 100 to wait (e.g., several milliseconds). In such an embodiment, the sensing and current controller 195 is operatively connected to the wire feeder 150 in order to command the wire feeder 150 to start and stop. The sensing and current controller 195 may command the hot wire power supply 170 to apply the heating current to heat the wire 140 and to again feed the wire 140 toward the workpiece 115.

Figure 3:
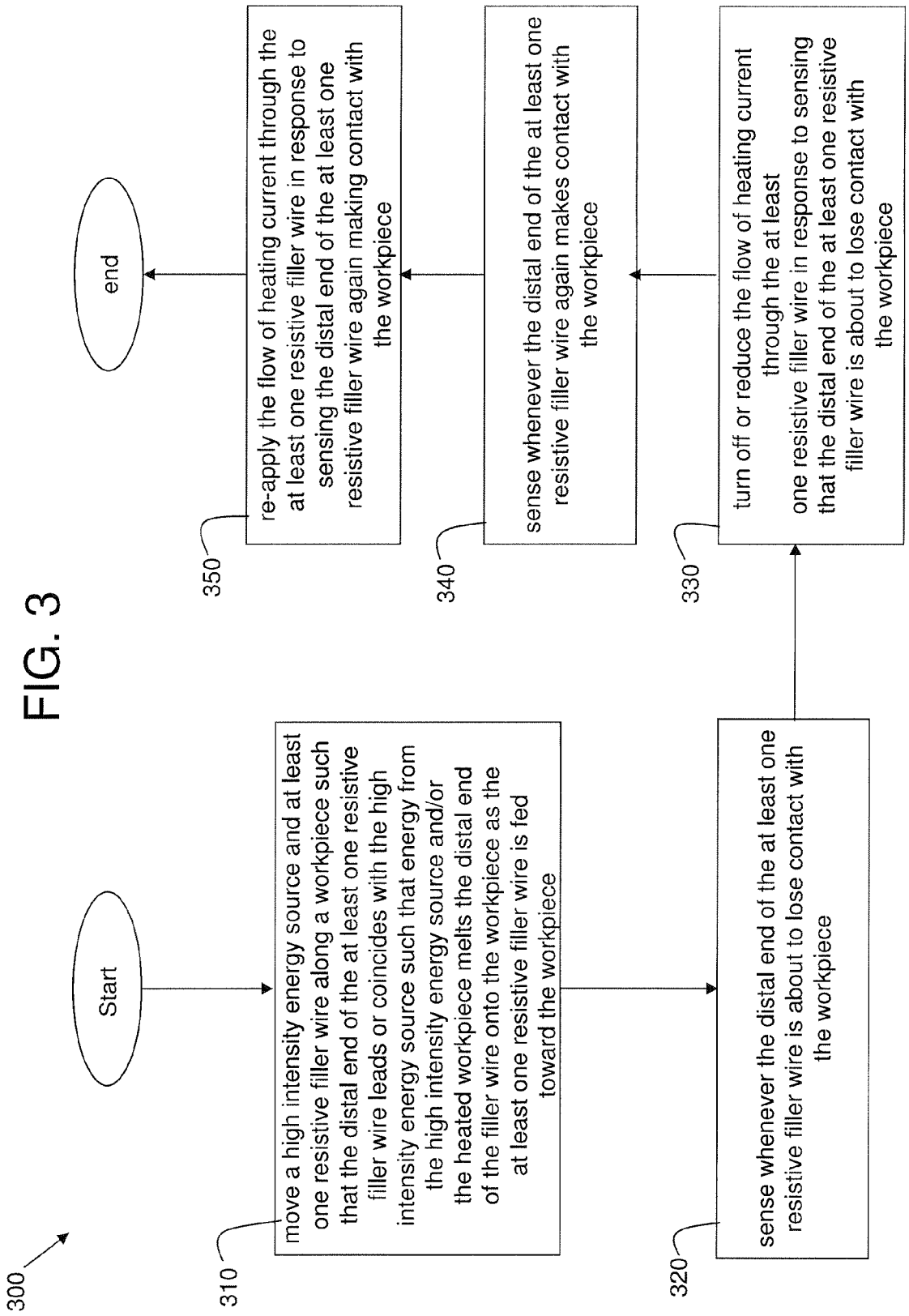
FIG. 3 illustrates a flow chart of an embodiment of a post start-up method used by the system of FIG. 1.

Once the start up method is completed, the system 100 may enter a post start-up mode of operation where the laser beam 110 and hot wire 140 are moved in relation to the workpiece 115 to perform one of a brazing application, a cladding application, a build-up application, or a hard-facing application. FIG. 3 illustrates a flow chart of an embodiment of a post start-up method 300 used by the system 100 of FIG. 1. In step 310, move a high intensity energy source (e.g., laser device 120) and at least one resistive filler wire 140 along a workpiece 115 such that the distal end of the at least one resistive filler wire 140 leads or coincides with the high intensity energy source (e.g., laser device 120) such that energy (e.g., laser beam 110) from the high intensity energy source (e.g., laser device 120) and/or the heated workpiece 115 (i.e., the workpiece 115 is heated by the laser beam 110) melts the distal end of the filler wire 140 onto the workpiece 115 as the at least one resistive filler wire 140 is fed toward the workpiece 115. The motion controller 180 commands the robot 190 to move the workpiece 115 in relation to the laser beam 110 and the hot wire 140. The laser power supply 130 provides the power to operate the laser device 120 to form the laser beam 110. The hot wire power supply 170 provides electric current to the hot wire 140 as commanded by the sensing and current controller 195.

In step 320, sense whenever the distal end of the at least one resistive filler wire 140 is about to lose contact with the workpiece 115 (i.e., provide a premonition capability). Such sensing may be accomplished by a premonition circuit within the sensing and current controller 195 measuring a rate of change of one of a potential difference between (dv/dt), a current through (di/dt), a resistance between (dr/dt), or a power through (dp/dt) the filler wire 140 and the workpiece 115. When the rate of change exceeds a predefined value, the sensing and current controller 195 formally predicts that loss of contact is about to occur. Such premonition circuits are well known in the art for arc welding.

When the distal end of the wire 140 becomes highly molten due to heating, the distal end begins to pinch off from the wire 140 onto the workpiece 115. For example, at that time, the potential difference or voltage increases because the cross section of the distal end of the wire decreases rapidly as it is pinching off. Therefore, by measuring such a rate of change, the system 100 may anticipate when the distal end is about to pinch off and lose contact with the workpiece 115. Also, if contact is fully lost, a potential difference (i.e., a voltage level) which is significantly greater than zero volts may be measured by the sensing and current controller 195. This potential difference could cause an arc to form (which is undesirable) between the new distal end of the wire 140 and the workpiece 115 if the action in step 330 is not taken.

In step 330, turn off (or at least greatly reduce, for example, by 95%) the flow of heating current through the at least one resistive filler wire 140 in response to sensing that the distal end of the at least one resistive filler wire 140 is about to lose contact with the workpiece 115. When the sensing and current controller 195 determines that contact is about to be lost, the controller 195 commands the hot wire power supply 170 to shut off (or at least greatly reduce) the current supplied to the hot wire 140. In this way, the formation of an unwanted arc is avoided, preventing any undesired effects such as splatter or burnthrough from occurring.

In step 340, sense whenever the distal end of the at least one resistive filler wire 140 again makes contact with the workpiece 115 due to the wire 140 continuing to advance toward the workpiece 115. Such sensing may be accomplished by the sensing and current controller 195 measuring a potential difference of about zero volts between the filler wire 140 (e.g., via the contact tube 160) and the workpiece 115. When the distal end of the filler wire 140 is shorted to the workpiece 115 (i.e., makes contact with the workpiece), a significant voltage level above zero volts may not exist between the filler wire 140 and the workpiece 115. The phrase "again makes contact" is used herein to refer to the situation where the wire 140 advances toward the workpiece 115 and the measured voltage between the wire 140 (e.g., via the contact tube 160) and the workpiece 115 is about zero volts, whether or not the distal end of the wire 140 actually fully pinches off from the workpiece 115 or not. In step 350, re-apply the flow of heating current through the at least one resistive filler wire in response to sensing that the distal end of the at least one resistive filler wire again makes contact with the workpiece. The sensing and current controller 195 may command the hot wire power supply 170 to re-apply the heating current to continue to heat the wire 140. This process may continue for the duration of the overlaying application.

Figure 4:
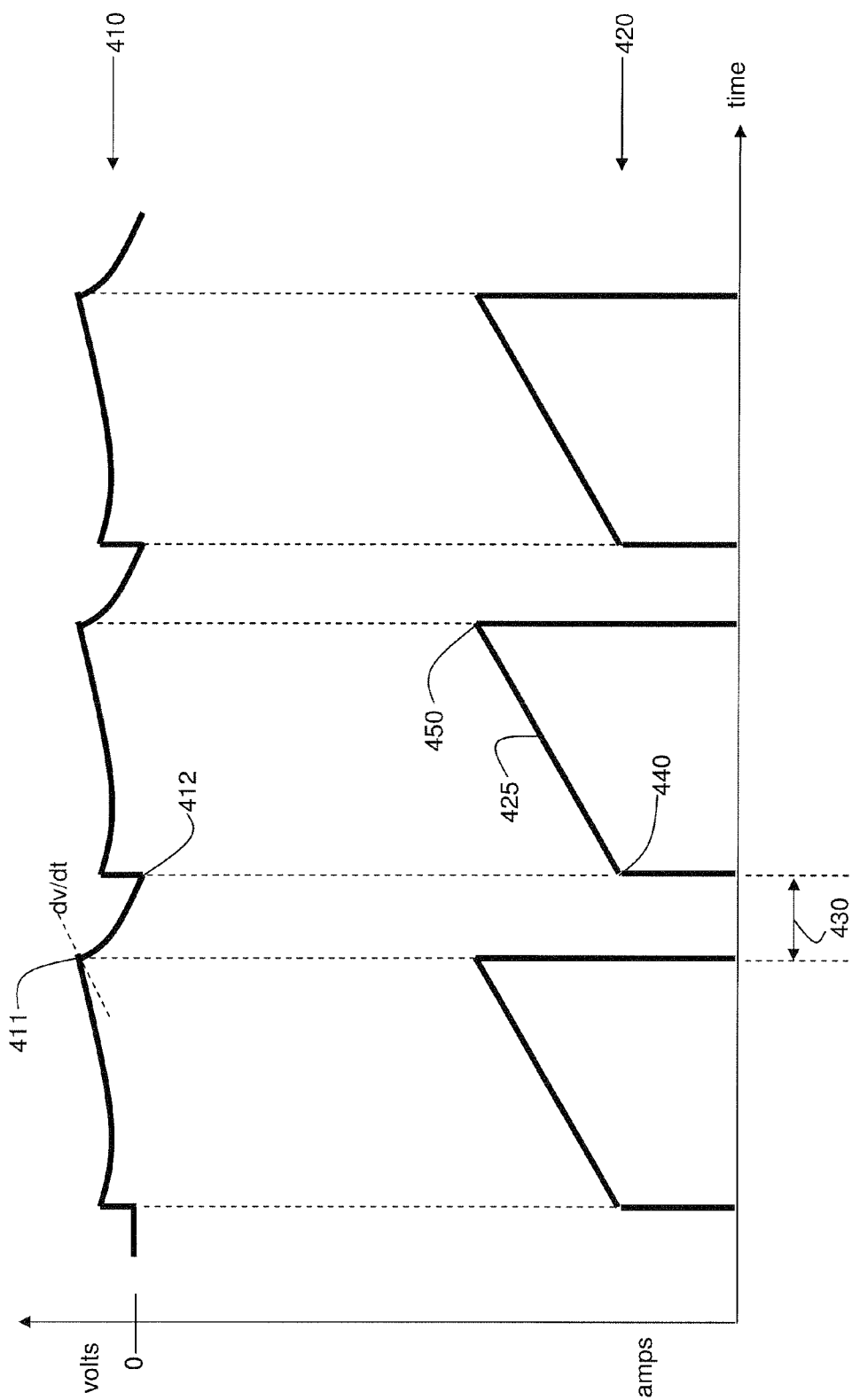
FIG. 4 illustrates a first exemplary embodiment of a pair of voltage and current waveforms associated with the post start-up method of FIG. 3.

For example, FIG. 4 illustrates a first exemplary embodiment of a pair of voltage and current waveforms 410 and 420, respectively, associated with the post start-up method 300 of FIG. 3. The voltage waveform 410 is measured by the sensing and current controller 195 between the contact tube 160 and the workpiece 115. The current waveform 420 is measured by the sensing and current controller 195 through the wire 140 and workpiece 115.

Whenever the distal end of the resistive filler wire 140 is about to lose contact with the workpiece 115, the rate of change of the voltage waveform 410 (i.e., dv/dt) will exceed a predetermined threshold value, indicating that pinch off is about to occur (see the slope at point 411 of the waveform 410). As alternatives, a rate of change of current through (di/dt), a rate of change of resistance between (dr/dt), or a rate of change of power through (dp/dt) the filler wire 140 and the workpiece 115 may instead be used to indicate that pinch off is about to occur. Such rate of change premonition techniques are well known in the art. At that point in time, the sensing and current controller 195 will command the hot wire power supply 170 to turn off (or at least greatly reduce) the flow of current through the wire 140.

When the sensing and current controller 195 senses that the distal end of the filler wire 140 again makes good contact with the workpiece 115 after some time interval 430 (e.g., the voltage level drops back to about zero volts at point 412), the sensing and current controller 195 commands the hot wire power supply 170 to ramp up the flow of current (see ramp 425) through the resistive filler wire 140 toward a predetermined output current level 450. In accordance with an embodiment of the present invention, the ramping up starts from a set point value 440. This process repeats as the energy source 120 and wire 140 move relative to the workpiece 115 and as the wire 140 advances towards the workpiece 115 due to the wire feeder 150. In this manner, contact between the distal end of the wire 140 and the workpiece 115 is largely maintained and an arc is prevented from forming between the distal end of the wire 140 and the workpiece 115. Ramping of the heating current helps to prevent inadvertently interpreting a rate of change of voltage as a pinch off condition or an arcing condition when no such condition exists. Any large change of current may cause a faulty voltage reading to be taken due to the inductance in the heating circuit. When the current is ramped up gradually, the effect of inductance is reduced.

Figure 5:
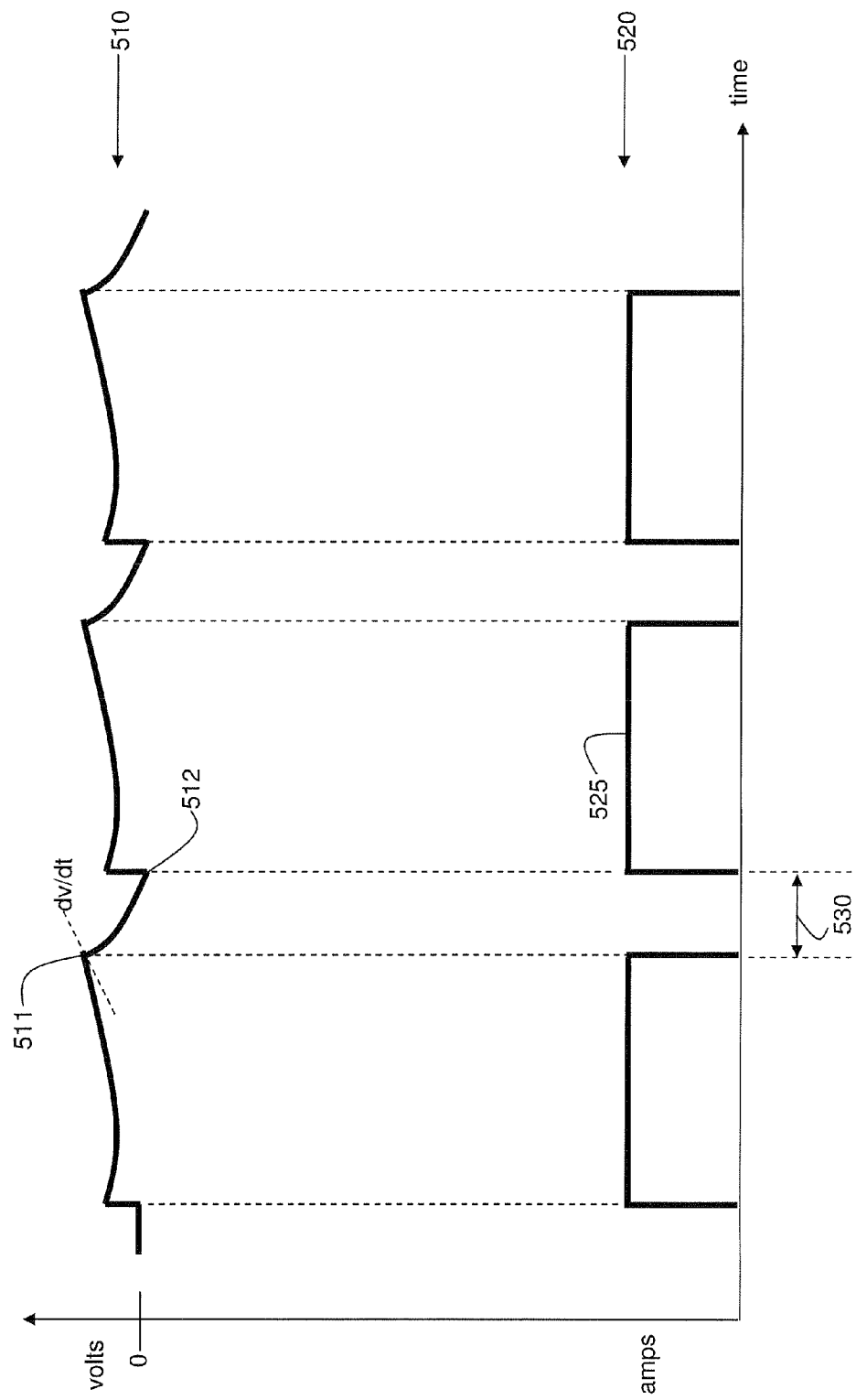
FIG. 5 illustrates a second exemplary embodiment of a pair of voltage and current waveforms associated with the post start-up method of FIG. 3.

FIG. 5 illustrates a second exemplary embodiment of a pair of voltage and current waveforms 510 and 520, respectively, associated with the post start-up method of FIG. 3. The voltage waveform 510 is measured by the sensing and current controller 195 between the contact tube 160 and the workpiece 115. The current waveform 520 is measured by the sensing and current controller 195 through the wire 140 and workpiece 115.

Whenever the distal end of the resistive filler wire 140 is about to lose contact with the workpiece 115, the rate of change of the voltage waveform 510 (i.e., dv/dt) will exceed a predetermined threshold value, indicating that pinch off is about to occur (see the slope at point 511 of the waveform 510). As alternatives, a rate of change of current through (di/dt), a rate of change of resistance between (dr/dt), or a rate of change of power through (dp/dt) the filler wire 140 and the workpiece 115 may instead be used to indicate that pinch off is about to occur. Such rate of change premonition techniques are well known in the art. At that point in time, the sensing and current controller 195 will command the hot wire power supply 170 to turn off (or at least greatly reduce) the flow of current through the wire 140.

When the sensing and current controller 195 senses that the distal end of the filler wire 140 again makes good contact with the workpiece 115 after some time interval 530 (e.g., the voltage level drops back to about zero volts at point 512), the sensing and current controller 195 commands the hot wire power supply 170 to apply the flow of heating current (see heating current level 525) through the resistive filler wire 140. This process repeats as the energy source 120 and wire 140 move relative to the workpiece 115 and as the wire 140 advances towards the workpiece 115 due to the wire feeder 150. In this manner, contact between the distal end of the wire 140 and the workpiece 115 is largely maintained and an arc is prevented from forming between the distal end of the wire 140 and the workpiece 115. Since the heating current is not being gradually ramped in this case, certain voltage readings may be ignored as being inadvertent or faulty due to the inductance in the heating circuit.

In summary, a method and system to start and use a combination wire feed and energy source system for any of brazing, cladding, building up, filling, and hard-facing overlaying applications are disclosed. High intensity energy is applied onto a workpiece to heat the workpiece. One or more resistive filler wires are fed toward the workpiece at or just in front of the applied high intensity energy. Sensing of when a distal end of the one or more resistive filler wires makes contact with the workpiece at or near the applied high intensity energy is accomplished. Electric heating current to the one or more resistive filler wires is controlled based on whether or not the distal end of the one or more resistive filler wires is in contact with the workpiece. The applied high intensity energy and the one or more resistive filler wires are moved in a same direction along the workpiece in a fixed relation to each other.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

What is claimed is:

1. A method to start and use a combination wire feed and energy source system for any of brazing, cladding, building up, filling, and hard-facing overlaying applications, said method comprising:
    applying a sensing voltage between at least one resistive filler wire and a workpiece via a power source;
    advancing a distal end of said at least one resistive filler wire toward said workpiece;
    sensing when said distal end of said at least one resistive filler wire first makes contact with said workpiece;
    turning off said power source to said at least one resistive filler wire over a defined time interval in response to said sensing;
    turning on said power source at an end of said defined time interval to apply a flow of heating current through said at least one resistive filler wire; and
    applying energy from a high intensity energy source to said workpiece to heat said workpiece at least while applying said flow of heating current.

2. The method of claim 1 further comprising:
    moving said high intensity energy source and said at least one resistive filler wire along said workpiece such that said distal end of said at least one resistive filler wire leads or coincides with said high intensity energy source such that energy from said high intensity energy source and/or said heated workpiece melts said distal end of said filler wire onto said workpiece as said at least one resistive filler wire is fed toward said workpiece;
    sensing whenever said distal end of said at least one resistive filler wire is about to lose contact with said workpiece;
    turning off or at least reducing said flow of heating current through said at least one resistive filler wire in response to sensing that said distal end of said at least one resistive filler wire is about to lose contact with said workpiece;
    sensing whenever said distal end of said at least one resistive filler wire again makes contact with said workpiece; and
    re-applying said flow of heating current through said at least one resistive filler wire in response to sensing said distal end of said at least one resistive filler wire again making contact with said workpiece.

3. The method of claim 1 wherein said sensing when said distal end of said at least one resistive filler wire makes contact with said workpiece is accomplished by measuring a potential difference of about zero volts between said at least one resistive filler wire and said workpiece.

4. The method of claim 1 further comprising:
    stopping said advancing of said at least one resistive filler wire in response to said sensing;
    restarting said advancing of said at least one resistive filler wire at said end of said defined time interval; and
    verifying that said distal end of said at least one resistive filler wire is still in contact with said workpiece before applying said flow of heating current.

5. The method of claim 2 wherein said sensing whenever said distal end of said at least one resistive filler wire is about to lose contact with said workpiece is accomplished by measuring a rate of change of one of a potential difference between, a current through, a resistance between, and a power through said at least one resistive filler wire and said workpiece.

6. The method of claim 2 wherein said sensing whenever said distal end of said at least one resistive filler wire again makes contact with said workpiece is accomplished by measuring a potential difference of about zero volts between said at least one resistive filler wire and said workpiece.

7. The method of claim 1 wherein said high intensity energy source includes at least one of laser device, a plasma arc welding device, a gas tungsten arc welding device, a gas metal arc welding device, a flux cored arc welding device, and a submerged arc welding device.

8. A system to start and use a combination wire feed and energy source for any of brazing, cladding, building up, filling, and hard-facing overlaying applications, said system comprising:
means for applying a sensing voltage between at least one resistive filler wire and a workpiece;
means for advancing a distal end of said at least one resistive filler wire toward said workpiece;
means for sensing when said distal end of said at least one resistive filler wire first makes contact with said workpiece;
means for preventing a flow of current through said at least one resistive filler wire over a defined time interval in response to sensing when said distal end of said at least one resistive filler wire first makes contact with said workpiece;
means for applying a flow of heating current through said at least one resistive filler wire at an end of said defined time interval; and
means for applying a high intensity energy to said workpiece at least while applying said flow of heating current.

9. The system of claim 8 further comprising:
means for moving said applied high intensity energy and said at least one resistive filler wire along said workpiece such that said distal end of said at least one resistive filler wire leads or coincides with said applied high intensity energy such that said applied high intensity energy and/or said heated workpiece melts said distal end of said filler wire onto said workpiece as said at least one resistive filler wire is fed toward said workpiece;
means for sensing whenever said distal end of said at least one resistive filler wire is about to lose contact with said workpiece;
means for turning off or at least reducing said flow of heating current through said at least one resistive filler wire in response to sensing that said distal end of said at least one resistive filler wire is about to lose contact with said workpiece;
means for sensing whenever said distal end of said at least one resistive filler wire again makes contact with said workpiece; and
means for re-applying said flow of heating current through said at least one resistive filler wire in response to sensing said distal end of said at least one resistive filler wire again making contact with said workpiece.

10. The system of claim 8 wherein said means for sensing when said distal end of said at least one resistive filler wire makes contact with said workpiece includes means for measuring a potential difference of about zero volts between said at least one resistive filler wire and said workpiece.

11. The system of claim 8 further comprising:
means for stopping said at least one resistive filler wire from advancing in response to sensing when said at least one resistive filler wire first makes contact with said workpiece;
means for re-advancing said at least one resistive filler wire in response to said end of said defined time interval; and
means for verifying that said distal end of said at least one resistive filler wire is still in contact with said workpiece before applying said flow of heating current.

12. The system of claim 9 wherein said means for sensing whenever said distal end of said at least one resistive filler wire is about to lose contact with said workpiece includes means for measuring a rate of change of one of a potential difference between, a current through, a resistance between, and a power through said at least one resistive filler wire and said workpiece.

13. The system of claim 9 wherein said means for sensing whenever said distal end of said at least one resistive filler wire again makes contact with said workpiece includes means for measuring a potential difference of about zero volts between said at least one resistive filler wire and said workpiece.

14. The system of claim 8 wherein said means for applying said high intensity energy includes at least one of laser device, a plasma arc welding device, a gas tungsten arc welding device, a gas metal arc welding device, a flux cored arc welding device. and a submerged arc welding device.

15. The method of claim 1, wherein the sensing voltage does not significantly heat the wire.

16. The system of claim 8, wherein the means for applying said sensing voltage provides for a sensing voltage that does not significantly heat the wire.

17. A system for performing an overlaying application including any of brazing, cladding, building up, and hard-facing, said system comprising: a high intensity energy subsystem that applies a high intensity energy onto a workpiece to heat said workpiece; a filler wire feeder subsystem that provides at least one resistive filler wire to make contact with said workpiece in the vicinity of said applied high intensity energy; a motion control subsystem that moves said applied high intensity energy and said at least one resistive filler wire in a same direction along said workpiece such that said applied high intensity energy and said at least one resistive filler wire remain in a fixed relation to each other; and a sensing and current control subsystem that provides a sensing signal to sense when said at least one resistive filler wire is in contact with said workpiece and controlling a flow of current through said at least one resistive filler wire in response to said sensing, wherein, during a startup mode, said system applies said sensing signal between said at least one resistive filler wire and said workpiece via a power source; advances a distal end of said at least one resistive filler wire toward said workpiece; senses when said distal end of said at least one resistive filler wire first makes contact with said workpiece; turns off said power source to said at least one resistive filler wire over a defined time interval in response to said sensing; turns on said power source at an end of said defined time interval to apply a flow of heating current through said at least one resistive filler wire; and applies said high intensity energy to said workpiece to heat said workpiece at least while applying said flow of heating current.

18. The system of claim 17 wherein, during a post start up mode, said system moves said applied high intensity energy and said at least one resistive filler wire along said workpiece such that said distal end of said at least one resistive filler wire leads or coincides with said applied high intensity energy such that said applied high intensity energy from said high intensity energy subsystem and/or said heated workpiece melts said distal end of said filler wire onto said workpiece as said at least one resistive filler wire is fed toward said workpiece; senses whenever said distal end of said at least one resistive filler wire is about to lose contact with said workpiece; turns off or at least reduces said flow of heating current through said at least one resistive filler wire in response to sensing that said distal end of said at least one resistive filler wire is about to lose contact with said workpiece; senses whenever said distal end of said at least one resistive filler wire again makes contact with said workpiece; and re-applies said flow of heating current through said at least one resistive filler wire in response to sensing said distal end of said at least one resistive filler wire again making contact with said workpiece.

19. The system of claim 17 wherein said sensing when a distal end of said at least one resistive filler wire makes contact with said workpiece is accomplished by measuring a potential difference of about zero volts between said at least one resistive filler wire and said workpiece.

20. The system of claim 17, wherein, during said start up mode, said system further stops said advancing of said at least one resistive filler wire in response to said sensing; restarts said advancing of said at least one resistive filler wire at said end of said defined time interval; and verifies that said distal end of said at least one resistive filler wire is still in contact with said workpiece before applying said flow of heating current.

21. The system of claim 18 wherein said sensing whenever said distal end of said at least one resistive filler wire is about to lose contact with said workpiece is accomplished by measuring a rate of change of one of a potential difference between, a current through, a resistance between, and a power through said at least one resistive filler wire and said workpiece.

22. The system of claim 18 wherein said sensing whenever said distal end of said at least one resistive filler wire again makes contact with said workpiece is accomplished by measuring a potential difference of about zero volts between said at least one resistive filler wire and said workpiece.

23. The system of claim 17 wherein said high intensity energy subsystem includes at least one of laser device, a plasma arc welding device, a gas tungsten arc welding device, a gas metal arc welding device, a flux cored arc welding device, and a submerged arc welding device.

* * * * *